(12) United States Patent
Rodriguez et al.

(10) Patent No.: US 12,101,459 B2
(45) Date of Patent: Sep. 24, 2024

(54) IMAGER HEALTH MONITORING SYSTEMS AND METHODS

(71) Applicant: Teledyne FLIR Commercial Systems, Inc., Goleta, CA (US)

(72) Inventors: Dylan M. Rodriguez, Goleta, CA (US); Eric A. Kurth, Santa Barbara, CA (US); Nicholas Högasten, Santa Barbara, CA (US); Theodore R. Hoelter, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 214 days.

(21) Appl. No.: 17/611,859

(22) PCT Filed: May 15, 2020

(86) PCT No.: PCT/US2020/033087
§ 371 (c)(1),
(2) Date: Nov. 16, 2021

(87) PCT Pub. No.: WO2020/236567
PCT Pub. Date: Nov. 26, 2020

(65) Prior Publication Data
US 2022/0217326 A1    Jul. 7, 2022

Related U.S. Application Data

(60) Provisional application No. 62/849,479, filed on May 17, 2019.

(51) Int. Cl.
*H04N 17/00* (2006.01)
*B60R 1/22* (2022.01)
(Continued)

(52) U.S. Cl.
CPC .............. *H04N 17/002* (2013.01); *B60R 1/22* (2022.01); *H04N 5/33* (2013.01); *H04N 25/21* (2023.01); *H04N 25/78* (2023.01); *G01J 5/20* (2013.01)

(58) Field of Classification Search
CPC ...... H04N 17/002; H04N 25/21; H04N 25/78; H04N 5/33; B60R 1/22
(Continued)

(56) References Cited

U.S. PATENT DOCUMENTS

| | | | |
|---|---|---|---|
| 7,571,484 B2 * | 8/2009 | Kraus | G06F 21/575 711/216 |
| 8,471,206 B1 * | 6/2013 | Kostrzewa | G01J 5/045 250/340 |

(Continued)

FOREIGN PATENT DOCUMENTS

| | | |
|---|---|---|
| EP | 2 589 513 | 8/2019 |
| GB | 2515472 A | 12/2014 |

(Continued)

OTHER PUBLICATIONS

International Search Report /Written Opinion assigned to PCT/2020/033087 dated Oct. 21, 2020 (20 pages).
Semiconductor Components Industries, LLC; On Semiconductor, Evaluating Functional Safety in Automotive Image Sensors, Publication Order No. TND6233/D; May 2018 (13 pages).

*Primary Examiner* — Joel W Fosselman
(74) *Attorney, Agent, or Firm* — Haynes and Boone, LLP

(57) ABSTRACT

Techniques are disclosed for imager health monitoring systems and methods. In one example, a method includes determining a characteristic of an active unit cell of a focal plane array (FPA) and/or a reference unit cell of the FPA. The active unit cell includes a detector selectively shielded from an incident scene. The reference unit cell includes a reference detector shielded from the incident scene. The (Continued)

method further includes determining a state of the FPA based at least in part on the characteristic. The method further includes transmitting an indication of the state of the FPA to selectively cause adjustment of the FPA Related devices and systems are also provided.

20 Claims, 9 Drawing Sheets

(51) Int. Cl.
    *G01J 5/20*     (2006.01)
    *H04N 5/33*     (2023.01)
    *H04N 25/21*     (2023.01)
    *H04N 25/78*     (2023.01)

(58) Field of Classification Search
    USPC .......................................................... 348/294
    See application file for complete search history.

(56) References Cited

U.S. PATENT DOCUMENTS

| | | |
|---|---|---|
| 2002/0185601 A1 | 12/2002 | McManus |
| 2014/0376767 A1 | 12/2014 | Powers |
| 2015/0254813 A1 | 9/2015 | Foi |
| 2016/0037186 A1 | 2/2016 | Wendel |
| 2016/0198102 A1 | 7/2016 | Chahine |
| 2016/0345005 A1 | 11/2016 | Hoekstra |
| 2017/0191868 A1* | 7/2017 | Kurth ................ H01L 27/14618 |
| 2019/0075251 A1 | 3/2019 | Nakamura |

FOREIGN PATENT DOCUMENTS

| | | |
|---|---|---|
| JP | 2005176232 A | 6/2005 |
| JP | 2015198343 A | 11/2015 |
| WO | WO 2014/093724 A1 | 6/2014 |
| WO | WO 2018/156668 A1 | 8/2018 |

* cited by examiner

FIG. 7

| ECU FC | ECU LC | Camera FC | Camera LC | Sensor FC | Sensor LC | Sensor LC PC | Sensor Meta | Sensor Line HASH | Camera LC PC | Camera Meta | Camera Line HASH | ECU LC PC | ECU Meta | ECU Line HASH |
|---|---|---|---|---|---|---|---|---|---|---|---|---|---|---|
| ECU FC | ECU LC(0) | Camera FC | Camera LC(0) | Sensor FC | Sensor LC(0) | Sensor Tele | | | Camera LC(0) PC | Camera Meta | Camera Line HASH | ECU LC(0) PC | ECU Meta | ECU Line HASH |
| ECU FC | ECU LC(1) | Camera FC | Camera LC(1) | Sensor FC | Sensor LC(1) | Sensor Data(0) / Sensor LC(0) PC | Sensor Meta | Sensor Line HASH | Camera LC(1) PC | Camera Meta | Camera Line HASH | ECU LC(1) PC | ECU Meta | ECU Line HASH |
| ECU FC | ECU LC(2) | Camera FC | Camera LC(2) | Sensor FC | Sensor LC(2) | Sensor Data(1) / Sensor LC(1) PC | Sensor Meta | Sensor Line HASH | Camera LC(2) PC | Camera Meta | Camera Line HASH | ECU LC(2) PC | ECU Meta | ECU Line HASH |
| ... | ... | ... | ... | ... | ... | ... / Sensor LC(2) PC | Sensor Meta | Sensor Line HASH | ... | ... | ... | ... | ... | ... |
| ... | ... | ... | ... | Sensor FC | Sensor LC(n) | Sensor Data(n) / Sensor LC(n) PC | Sensor Meta | Sensor Line HASH | ... | ... | ... | ... | ... | ... |
| ... | ... | Camera FC | Camera LC(m) | | | | | | Camera LC(m) PC | Camera Meta | Camera Line HASH | | | |
| ECU FC | ECU LC(p) | | | | | | | | | | | ECU LC(p) PC | ECU Meta | ECU Line HASH |

IMAGER HEALTH MONITORING SYSTEMS AND METHODS

CROSS-REFERENCE TO RELATED APPLICATIONS

This patent application is a U.S. National Stage Patent Application under 35 U.S.C. 371 of International Patent Application No. PCT/US2020/033087 filed May 15, 2020 and entitled "IMAGER HEALTH MONITORING SYSTEM AND METHOD," which claims priority to and the benefit of U.S. Provisional Patent Application No. 62/849,479 filed May 17, 2019 and entitled "IMAGER HEALTH MONITORING SYSTEMS AND METHODS," which is hereby incorporated by reference in its entirety.

TECHNICAL FIELD

One or more embodiments relate generally to imaging systems and more particularly, for example, to imager health monitoring systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes determining a characteristic of at least one active unit cell of a focal plane array and/or at least one reference unit cell of the focal plane array. The at least one active unit cell includes a detector selectively shielded from an incident scene. The at least one reference unit cell includes a reference detector shielded from the incident scene. The method further includes determining a state of the focal plane array based at least in part on the characteristic. The method further includes transmitting an indication of the state of the focal plane array to selectively cause adjustment of the focal plane array.

In one or more embodiments, an imaging system includes a focal plane array. The focal plane array includes a plurality of active unit cells. Each active unit cell includes a detector configured to selectively generate an output in response to an incident scene. The focal plane array further includes a plurality of reference unit cells. Each reference unit cell includes a detector and a structure configured to block the incident scene from the detector of the reference unit cell. The imaging system further includes a processing circuit configured to determine a characteristic of at least one active unit cell of the plurality of active unit cells and/or at least one reference unit cell of the plurality of reference unit cells. The processing circuit is further configured to determine a state of the focal plane array based at least in part on the characteristic. The processing circuit is further configured to transmit an indication of the state of the focal plane array to selectively cause adjustment of the focal plane array.

In one or more embodiments, a method includes receiving an image including data and a first hash value. The method further includes generating a second hash value based on the data. The method further includes determining a validity of the image based on the first hash value and the second hash value.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 illustrates an example image frame format in accordance with one or more embodiments of the present disclosure.

Figure 1:
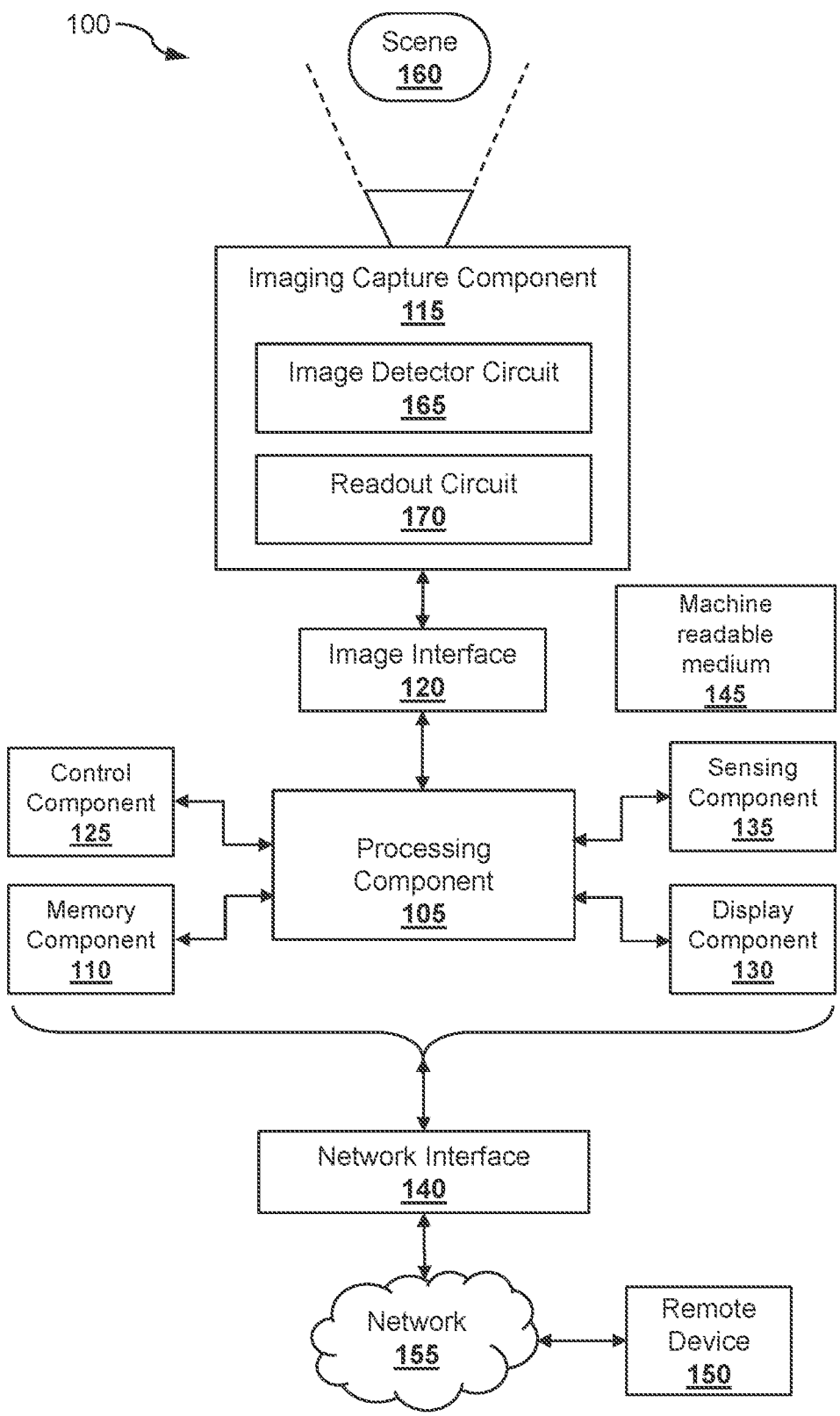
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims. It is noted that sizes of various components are not necessarily drawn to scale in the drawings.

In one or more embodiments, various systems and methods are provided to facilitate monitoring health of an imaging device. The imaging device may include a focal plane array (FPA) that includes active unit cells and reference unit cells. Monitoring the health of the imaging device may be based on a characteristic(s) of the active unit cells of the imaging device and/or a corresponding characteristic(s) of the reference unit cells of the imaging device. As one example, monitoring the health of the imaging device may be based on a comparison of the characteristic(s) of the active unit cells and the corresponding characteristic(s) of the reference unit cells, such as a comparison of noise characteristics. In some aspects, image frames transmitted by the imaging device may utilize image frame formats that facilitate verification of data contained in the image frames.

Each active unit cell may include a detector (e.g., also referred to as a pixel). The detector of each active unit cell may capture a portion of an incident scene and generate an associated output. Each active unit cell has a structure (e.g., shutter, lid, cover, paddle) or portion thereof that selectively blocks the detector of the active unit cell from the scene incident on the active unit cell. In some cases, the structure provides/presents a uniform scene to the detectors. Each reference unit cell may include a detector and a structure (e.g., shutter, lid, cover, paddle) or portion thereof that blocks incident or external radiation (e.g., thermal radiation) from being received by the detector. In this regard, the structure blocks the detector from the scene that is incident on the active unit cells. In some cases, the reference unit cells may be outside of an active array that includes the active unit cells and behave like the active detectors, except that the reference unit cells are shielded from the scene and thus effectively blinded from the scene. As such, a reference unit cell and its detector may be referred to as a blind unit cell and a blind detector, respectively. In an embodiment, each of the active unit cells and reference unit cells includes a bolometer (e.g., microbolometer) as their detector.

In some aspects, the imaging device may be part of a larger system. In some cases, the larger system may include one or more additional sensors. For explanatory purposes, the imaging device may be utilized in advanced driver assistance systems (ADAS) of automotive vehicles (AVs). In the automotive industry, imaging systems may be utilized in ADAS and AV for safety critical applications, such as braking, steering, and acceleration. There are varying ratings of automotive safety integrity levels (ASIL) depending on criticality of the function. ASIL ratings may be determined, for instance, by the severity of a fault, the probability of the fault occurring, and ability to detect and control the effects. It is noted that although various embodiments are described in relation to the automotive industry, the imaging device may be utilized by itself (e.g., not part of any larger system) or as part of one or more systems unassociated with the automotive industry.

In various embodiments, fault detection can be included in the imaging device (e.g., rather than implementing fault detection algorithms downstream of the imaging device) to decrease a fault detection time interval (FTDI). Detection and communication of potential faults in the imaging device to a safety system can facilitate mitigation of such faults and can allow a host (e.g., an ADAS host system or user thereof) to make decisions to assess and ensure safety of a system (e.g., an AV system).

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of electromagnetic (EM) radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 100 in FIG. 1 may represent the housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, etc.) of the imaging system 100 to perform such operations. For example, the processing component 105 may be configured to process captured image data received from the image capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115. The processing component 105 may be configured to store processed still and/or video images in the memory component 110. In some aspects, the memory component 110 may include information that can be utilized as a reference point for comparison purposes to determine health of the imaging system 100. By way of non-limiting examples, the information may include characteristics associated with an image detector circuit 165, such as power spectral densities, thermal time constants, and so forth.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes the image detector circuit 165 (e.g., a thermal infrared detector circuit) and a readout circuit 170 (e.g., an ROIC). In some aspects, the image detector circuit 165 includes active unit cells and reference unit cells. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MMIR) radiation (e.g., EM radiation with wavelength of 2-5 μm) and/or long-wave IR (LWIR) radiation (e.g., EM radiation with wavelength of 7-14 μm), or any desired IR wavelengths (e.g., generally in the 0.7 to 14 μm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. In an aspect, each detector has an active area for capturing the respective portion of the image data. A non-active area of a detector may refer to any portion of the detector that is not the active area. The pixel value generated by the detector may be referred to as an output of the detector. By way of non-limiting example, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. Although the present disclosure generally refers to various operations performed on rows and/or columns, rows may be used as columns and columns may be used as rows as appropriate.

In an aspect, the imaging system 100 (e.g., the image capture component 115 of the imaging system 100) may include one or more optical elements (e.g., mirrors, lenses, beamsplitters, beam couplers, etc.) to direct EM radiation to the image detector circuit 165. In some cases, an optical element may be at least partially within the housing of the imaging system 100.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an embodiment, the pixel values generated by the image detector circuit 165 may be represented in terms of digital count values generated based on the electrical signals obtained from converting the detected radiation. For example, in a case that the image detector circuit 165 includes or is otherwise coupled to an ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The image detector circuit 165 may be coupled to the readout circuit 170. The readout circuit 170 may be provided on a substrate formed from, for example, silicon, silicon carbide, gallium arsenide, germanium, or any other material appropriate to support integration of semiconductor devices. The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period). In some cases, ADC circuits to generate digital count values for detectors of the image detector circuit 165 may be implemented as part of the image detector circuit 165. In other cases, such ADC circuits may be implemented as part of the readout circuit 170.

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may comprise an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include the network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, the image capture component 115, the image interface 120, the display component 130, the sensing component 135, and/or the network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2A:
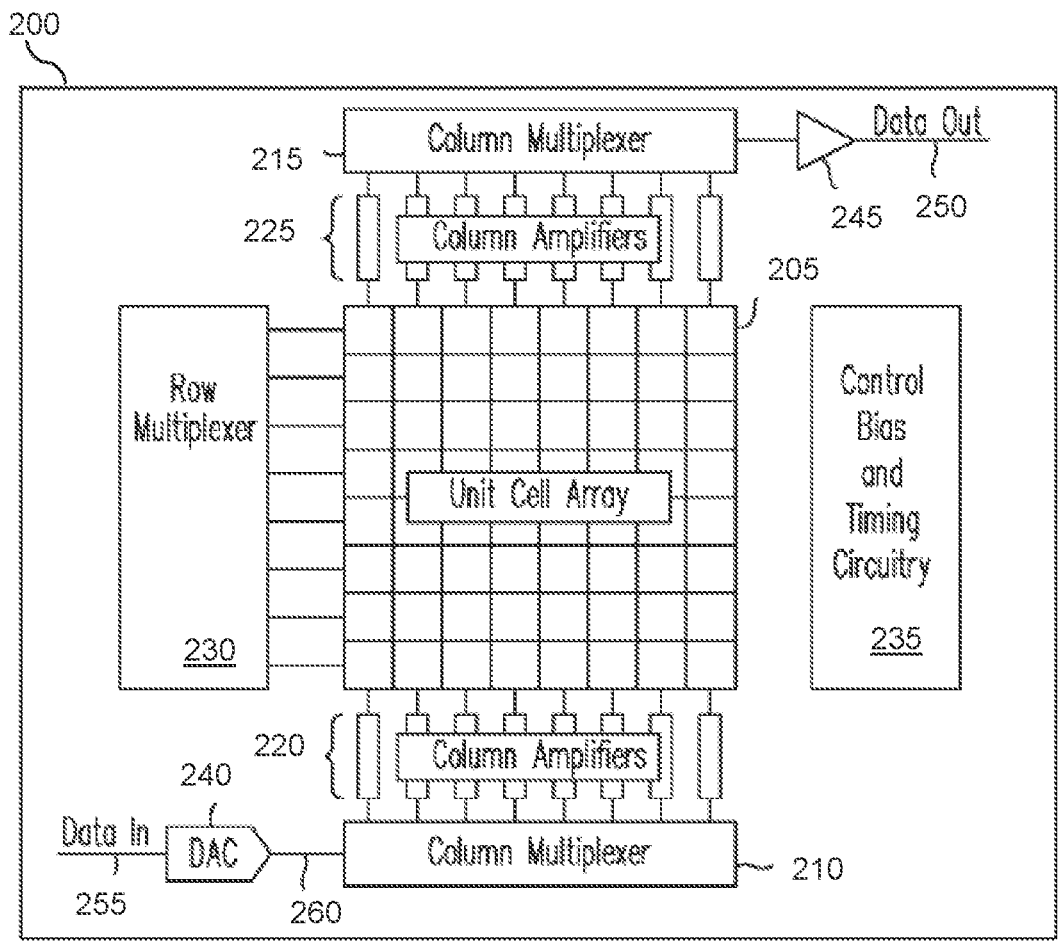
FIG. 2A illustrates a block diagram of an example image sensor assembly in accordance with one or more embodiments of the present disclosure.

FIG. 2A illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 215, the column amplifiers 220, the row multiplexer 230, and the data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, the data input signal line 255, and/or the analog signal line(s) 260. In an embodiment, the control bias and timing circuitry 235 may be, may include, may be a part of, or may otherwise be coupled to the processing component 105 and/or image capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel. In an aspect, the unit cell array 205 may include active unit cells and reference unit cells. In another aspect, the unit cell array 205 may include only active unit cells. In this regard, the reference unit cells (if present) may be considered separate from the unit cell array 205.

Figure 2B:
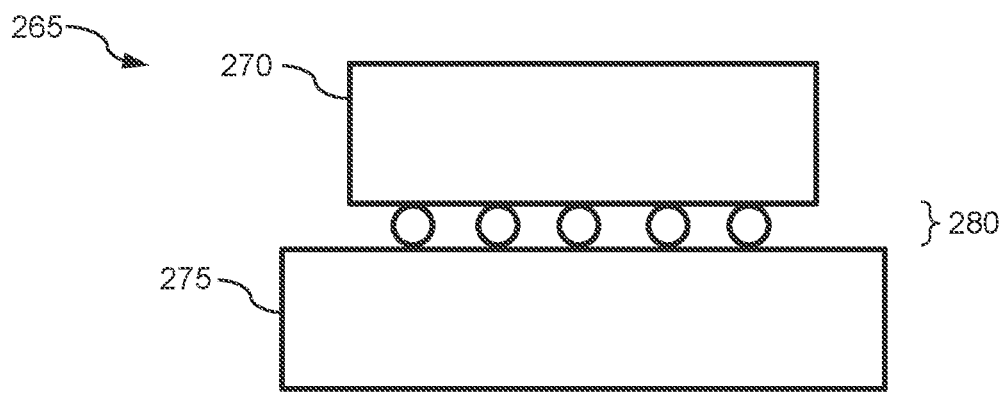
FIG. 2B illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 2B illustrates an example image sensor assembly 265 in accordance with one or more embodiments of the present disclosure. Not all of the depicted components may be required, however, and one or more embodiments may include additional components not shown in the figure.

Variations in the arrangement and type of the components may be made without departing from the spirit or scope of the claims as set forth herein. Additional components, different components, and/or fewer components may be provided. In an embodiment, the image sensor assembly 265 may be, may include, or may be a part of, the image sensor assembly 200.

The image sensor assembly 265 includes a device wafer 270, a readout circuit 275, and contacts 280 to bond (e.g., mechanically and electrically bond) the device wafer 270 to the readout circuit 275. The device wafer 270 may include detectors (e.g., the unit cell array 205). The contacts 280 may bond the detectors of the device wafer 270 and the readout circuit 275. The contacts 280 may include conductive contacts of the detectors of the device wafer 270, conductive contacts of the readout circuit 275, and/or metallic bonds between the conductive contacts of the detectors and the conductive contacts of the readout circuit 275. For example, the contacts 280 may include contact layers formed on the detectors to facilitate coupling to the readout circuit 275. In one embodiment, the device wafer 270 may be bump-bonded to the readout circuit 275 using bonding bumps. The bonding bumps may be formed on the device wafer 270 and/or the readout circuit 275 to allow connection between the device wafer 270 and the readout circuit 275. In an aspect, hybridizing the device wafer 270 to the readout circuit 275 may refer to bonding the device wafer 270 (e.g., the detectors of the device wafer 270) to the readout circuit 275 to mechanically and electrically bond the device wafer 270 and the readout circuit 275. In an embodiment, a light shield may be coupled to a surface of the readout circuit 275 to block stray light from being captured by the detectors of the device wafer 270.

In one or more embodiments, various systems and methods are provided to facilitate monitoring health of an imaging device. In an embodiment, the imaging device may be, may include, or may be a part of, the imaging system 100 of FIG. 1. The imaging device may include an FPA that includes active unit cells and reference unit cells. Each active unit cell may include a detector. The detector of each active unit cell may capture a portion of an incident scene and generate an associated output. Each active unit cell has a structure (e.g., shutter, lid, cover, paddle) or portion thereof that selectively blocks the detector of the active unit cell from the scene incident on the active unit cell. Each reference unit cell may include a detector and a structure (e.g., shutter, lid, cover, paddle) or portion thereof that blocks incident or external radiation (e.g., thermal radiation) from being received by the detector. In some cases, on a chip, the reference unit cells may be outside of an active array that includes the active unit cells and behave like the active detectors, except that the reference detectors are shielded from the scene and thus effectively blinded from the scene. In an embodiment, the active unit cells and reference unit cells include a bolometer (e.g., microbolometer) as their detector.

In various embodiments, monitoring the health of an imaging device may be based on a characteristic(s) of the active unit cells of the imaging device and/or a characteristic(s) of the reference unit cells of the imaging device. In some aspects, monitoring the health of an imaging device may be based on comparing a characteristic(s) of the active unit cells with a corresponding characteristic(s) of the reference unit cells. Alternatively or in addition, monitoring the health of an imaging device may be based on comparing a characteristic(s) of the active unit cells and/or reference unit cells with a corresponding characteristic(s) previously determined and stored (e.g., such as during a calibration event performed at the factory or in the field). In some cases, the imaging device is part of a larger system (e.g., an ADAS). The imaging device may indicate (e.g., send a message, indication, alert) to the system health of the imaging device or components thereof (e.g., reference unit cells, active unit cells), such that problems with the imaging device or outputs thereof (e.g., images) can be addressed, mitigated, and/or processed accordingly. By way of non-limiting examples, when a potential problem of the imaging device is identified, the system may perform mitigation actions such as utilizing a different imaging device for imaging a scene, powering down the imaging device until the imaging device can be fixed, ignoring images of the scene being provided by the imaging device (e.g., since the images may be an inaccurate representation of the scene), and/or other actions.

For explanatory purposes, the imaging device is or includes an infrared imaging device, although the various embodiments may be applied to imaging devices utilized to capture images of wavebands outside of the infrared wavebands. With regard to infrared imaging devices, the active unit cells may be sensitive to changes (e.g., minute changes) in scene temperature. As an example, for a bolometer, a resistance of a bolometer changes in response to a change in scene temperature. A change in resistance of each bolometer may be translated into a time-multiplexed electrical signal by an ROIC of the FPA. Various types of infrared detectors rely on high thermal isolation from the surrounding environment to achieve a desired level of performance (e.g., desired detector sensitivity). For example, to achieve a desired level of performance, the active unit cells are thermally isolated from an ROIC coupled to the active unit cells and/or convection within a sensor cavity.

In various aspects, an FPA formed of a detector array (e.g., bolometer array) and an ROIC may be situated within a vacuum package to provide a high vacuum environment that facilitates achieving of a desired sensitivity from the detector array. Vacuum integrity may degrade over time due to various factors, such as outgassing and/or leaks. For instance, when vacuum is lost, air and/or other gases may enter the sensor cavity and adversely affect the detector's thermal isolation. Such degradation in vacuum integrity may result in a gradual loss of vacuum pressure and consequently a reduction in sensitivity and overall performance of the FPA. The reference detectors of the FPA are shielded from incident or external radiation and, similar to the active detectors, are substantially thermally isolated from the ROIC substrate. The active detectors and reference detectors may share various properties, such as operating within the same vacuum cavity, temporal noise properties, and/or spatial noise properties. The sharing of such properties may allow the reference unit cells to be utilized for fault detection and compensation techniques. As such, using various embodiments, comparisons between the active unit cells and the reference unit cells may be utilized to monitor health of the imaging device.

In some embodiments, vacuum integrity may be determined based on noise associated with the active detectors and noise associated with the reference detectors. In this regard, noise characteristics of the active detectors and those of the reference detectors can be monitored and compared to determine vacuum integrity and thus determine a health of the imaging device that includes the active detectors and the reference detectors. In some aspects, noise can be characterized (e.g., quantified) by measuring a power spectral density (PSD). The PSD may include fixed pattern noise (FPN) and temporally varying random noise (RND). In terms of noise characteristics, a degradation or loss of vacuum may reduce or remove thermal isolation of the detectors as the detectors thermally couple to the ambient cavity, creating a more uniform output of each detector and a lower temporal RND noise as a time constant increases. When a vacuum level associated with the active detectors and/or the reference detectors is determined to have dropped below a threshold, a fault associated with the active detectors and/or the reference detectors may be present. In other cases, other manners by which to characterize noise may be utilized. The PSD and/or other characterizations of noise can be determined during calibration.

Figure 3A:
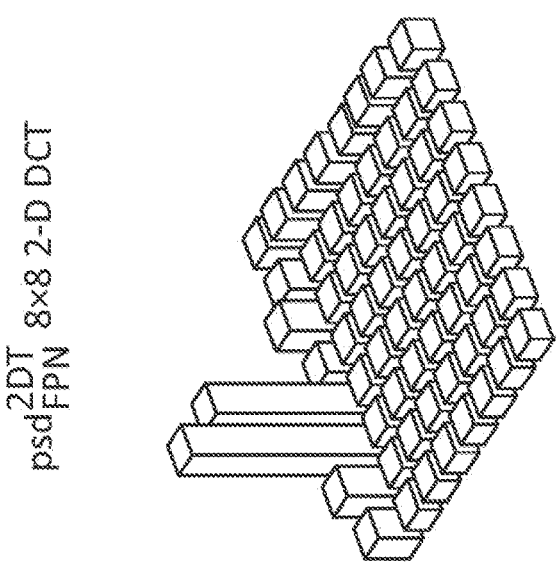
FIGS. 3A, 3B, and 3C characterize a power spectral density of fixed pattern noise, random noise, and a weighted sum of the fixed pattern noise and random noise, respectively, in accordance with one or more embodiments of the present disclosure.
Figure 3B:
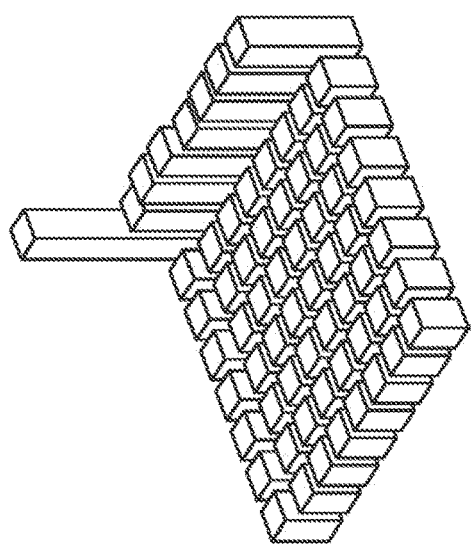
Figure 3C:
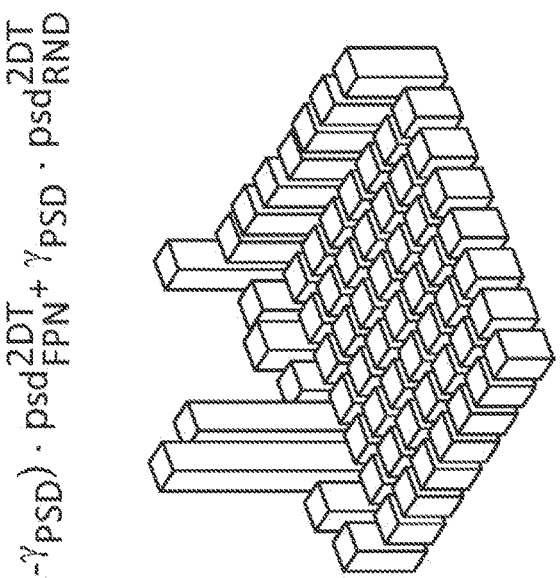

In an aspect, each detector may be utilized to capture frames and these frames utilized to compute/characterize a PSD of the detector. The FPN and RND components of the PSD can be characterized in various manners. In one case, the FPN component and RND component can be characterized using two-dimensional (2D) discrete cosine transforms (DCTs). As an example, FIGS. 3A, 3B, and 3C compute/characterize a PSD of the FPN, the RND, and a weighted sum (e.g., mixture) of the FPN and the RND using 2D DCTs of size 8×8. In FIG. 3C, $\gamma_{PSD}$=0.5.

In some embodiments, to obtain the FPN and RND, a shutter event may be performed in which a shutter or similar structure is used to block scene content from the active detectors (e.g., active bolometers). As such, during a shutter event, the active detectors are blocked from the scene while the reference detectors remain blocked from the scene. The FPN and RND may be determined at calibration and refined during each shutter event if needed. For a given detector, once the PSD (e.g., 8×8 matrix in the example of FIGS. 3A-3C) of the detector is determined at the factory or otherwise in a known healthy state of the detector, the detector's characteristics generally do not change so long as the detector is in the same state of health as the detector was characterized in. In some cases, the PSD of a detector can be stored to provide a known healthy state of the detector to be compared during run time of the detector to determine, during run-time, whether the detector is still in a healthy state. In this regard, at a given moment during run-time, the PSD may be determined and compared to one or more historic performances determined from calibration to determine health of the detector. In some cases, the shutter event may be part of a larger calibration event. In some cases, the PSD of each detector may be determined before leaving the factory. For example, before leaving the factory, the detectors may be used to capture frames and compute/characterize the detectors' PSD based on the captured frames. The PSD of each detector can be subsequently measured and refined during each shutter event (e.g., performed in the field) if needed.

The PSD can be determined during normal operation (e.g., when the structure is not blocking the scene from the active detectors). While imaging a real world scene, the PSD of the active detectors is different from the PSD of the active detectors when imaging a uniform scene, such as a scene provided during a calibration event or a shutter event. When the active detectors are imaging a real scene, the blind detectors are still blocked by a structure from the scene and thus blind to the scene. In this regard, the PSD of the reference detectors may be utilized to represent a known state of a uniform image. An active detector's PSD scales over an operating temperature range as a background signal changes and as the noise scales with the signal. A reference detector can have its PSD computed on each frame to normalize the active detector's PSD. The reference detector's PSD may provide a calibration of an active detector's noise characteristics on the fly (e.g., during run-time in the field) over temperature.

In some embodiments, the PSD associated with the active unit cells and the reference unit cells can be utilized in real-time and compared to historical PSD values associated with the imaging device to indicate health of the imaging device. In some aspects, health of the imaging device (e.g., heath of the active unit cells and/or the reference unit cells) can be determined based on a comparison of the PSD associated with the active unit cells with the PSD associated with the reference unit cells.

In a first example of a potential failure mode, an active detector has a PSD that is the same as (e.g., matches) or sufficiently similar to the PSD of a reference detector when the active detector is supposed to be imaging a real scene (e.g., not a uniform scene used for calibration purposes). Such a situation may be indicative of a stuck structure (e.g., shutter is unable to be moved out of the active detector's field of view), occluded optics, and/or an indication of a poor signal from the scene. In cases that the imaging device is part of a larger system (e.g., an ADAS), the imaging device may indicate (e.g., send a message, indication, alert) to the system that quality of the scene and/or images of the scene captured by the imaging device may be poor, and/or a problem with the active detectors and/or the reference detectors may be present. As an example, in an aspect, a shutter event may be utilized to determine a PSD of pure noise, with the pure noise PSD measured at calibration and refined during each shutter event if needed. If a captured signal does not differ from pure noise, there is a chance that a shutter is stuck closed, an aperture is blocked, a loss of vacuum, a broken lens, lack of focus, a weather condition non-conducive to imaging is present (e.g., extreme humidity), or otherwise the active detector is essentially blind.

Conversely, when a structure (e.g., shutter, uniform paddle) is closed over the active detectors, the active detectors may be expected to have characteristics similar to calibration and within measurement error to the reference detectors. In a second example of a failure mode, the PSD of the active detectors differs from the PSD of the reference detectors during a calibration event and/or a shutter event. In this case, the structure may be stuck (e.g., a shutter may be unable to be closed over an active detector). As an example of utilizing the reference detectors, since the reference detectors are not responsive to a change in the scene, offsets in the reference detectors track a temperature of the FPA. In some cases, if the imaging device utilizes an internal shutter (e.g., between optics and FPA), a temperature of the structure can also be approximately the temperature of the FPA. During a shutter event, an offset from the reference detectors can be compared to the active detectors and an average of the two fields compared. In a normal state (e.g., non-failure state), an average of the two fields is generally similar. If the two fields vary by more than a threshold amount, the shutter of the active unit cells may be stuck open (e.g., not closed over the active detectors). In cases that the imaging device is part of a larger system (e.g., an ADAS), the imaging device may indicate (e.g., send a message, indication, alert) to the system that a problem with the active detectors and/or the reference detectors may be present.

In general, a response of a detector to a change in signal (e.g., change in IR radiation) is not instantaneous. In a case that the detector is a bolometer, the response of the detector may be a change in resistance in response to a change in the IR radiation received by the detector. As an example, in a bolometer array, each active bolometer is configured to receive external IR radiation and substantially thermally isolated from the ROIC substrate. Bolometer resistance changes as a function of temperature, with a change in resistance being measured and translated into a signal by the ROIC. The bolometer array is generally sensitive to minute changes in temperature, with such sensitivity facilitated through the bolometer's thermal isolation from the ROIC and/or convection within a sensor cavity.

Figure 4:
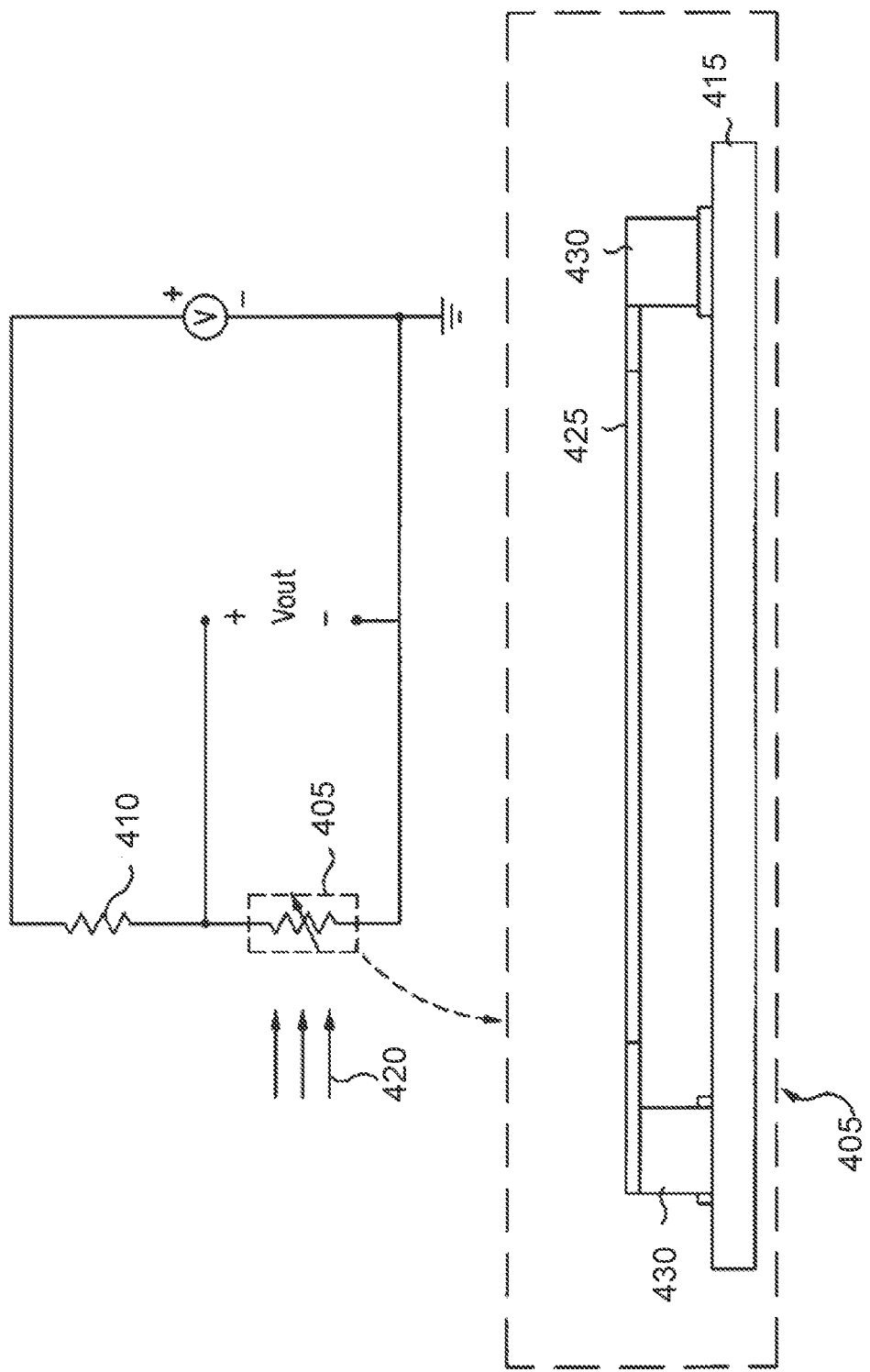
FIG. 4 illustrates a circuit diagram illustrating an example of a circuit for measuring microbolometer resistance along with a side view of a microbolometer in accordance with one or more embodiments of the present disclosure.

As an example, FIG. 4 illustrates a circuit diagram illustrating an example of a circuit for measuring microbolometer resistance along with a side view of a microbolometer in accordance with one or more embodiments of the present disclosure. However, FIG. 4 is not limiting and embodiments disclosed herein may be applied to a wide variety of temperature-sensing devices (e.g., infrared detectors), which exhibit self-heating from an application of electrical bias, and associated circuitry configurations. Thus, although a microbolometer may be discussed in one or more embodiments as a specific implementation example, it should be understood that the techniques disclosed herein may be applied to a wide variety of temperature-sensing devices and associated configurations.

As shown in FIG. 4, a voltage (denoted as V) is applied across a series combination of a microbolometer 405 and a resistance load 410. The microbolometer 405 (e.g., also referred to as an active microbolometer) is thermally isolated from a substrate 415 and receives an incident infrared radiation 420, while the resistive load 410, which may be a microbolometer (e.g., also referred to as a load microbolometer), is thermally shorted to the substrate 415. The substrate 415 may include an ROIC. As an example, the microbolometer 405 (e.g., cross-sectional side view example shown in FIG. 4) provides a bridge 425 via legs 430, with the legs 430 providing structural support, thermal isolation, and electrical connectivity for the bridge 425 to the substrate 415. An output voltage (denoted as $V_{out}$) is measured across the microbolometer 405 to determine the resistance of the microbolometer 405.

For microbolometers, such as the microbolometer 405, resistance of the microbolometers change as a function of temperature. As such, capture of an infrared image is based on measurements of the resistances of the microbolometers. To have the captured IR image accurately represent infrared radiation (e.g., 420) of the scene, the microbolometers are thermally isolated from the ROIC and the convection within a sensor cavity.

In some embodiments, a thermal time constant (TTC) may be utilized to determine a health of the active unit cells and/or the reference unit cells. Characterization of a rate of change of the bolometer may be provided by the bolometer's TTC. The TTC provides a measure indicative of an amount of time needed by the detector to change to a resistance level indicative of the signal received by the detector. When an instantaneous signal is presented to the bolometer, the amount of time to change the resistance of the bolometer by $(1-1/e)$ (i.e., about 63%) is the TTC of the bolometer. For each successive TTC period, the resistance of the bolometer changes by another $(1-1/e)$ relative to a previous TTC period. As an example, a nominal TTC of a bolometer may be 8 milliseconds.

Figure 5:
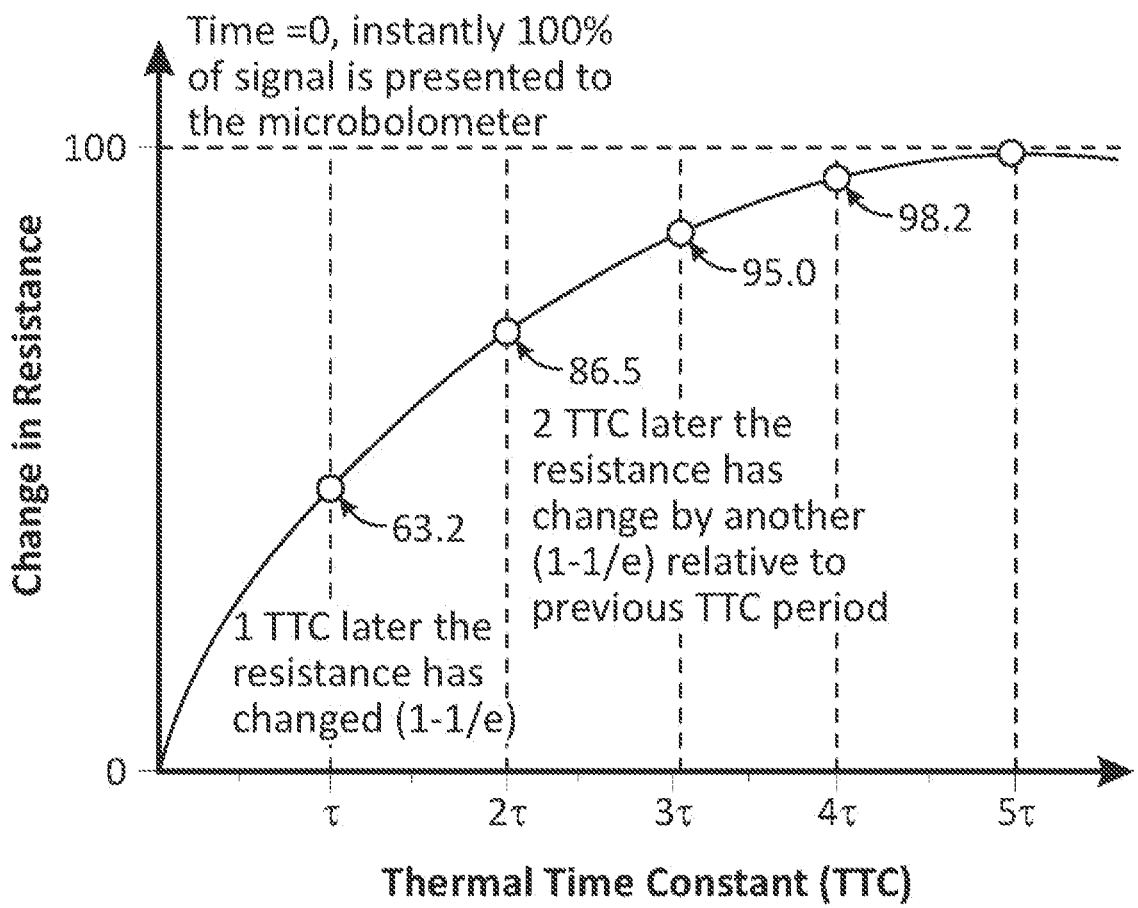
FIG. 5 illustrates an example graph of a change in resistance of a bolometer as a function of time in accordance with one or more embodiments of the present disclosure.

As an example, FIG. 5 illustrates an example graph of a change in resistance of a bolometer as a function of time in accordance with one or more embodiments of the present disclosure. At a time t=0, instantly 100% of a signal is presented to the microbolometer. After one TTC has elapsed (represented as t=τ), a resistance of the microbolometer has changed by $(1-1/e)$ (e.g., around 63%). After another TTC has elapsed (represented as t=2τ), the resistance of the bolometer has changed by another $(1-1/e)$ relative to the resistance at t=τ. In the graph, at t=τ, the change in resistance of the detector is indicative of around 63% of the signal received by the bolometer. At t=2τ, 3τ, and 4τ, the change in resistance of the detector is indicative of around 86.5%, 95.0%, and 98.2% of the signal received by the bolometer.

In an aspect, a detector's TTC can be determined by measuring self-heating from pulse-biasing the detector. A bias (e.g., bias voltage and/or bias duty cycle) can be changed to heat the active bolometers beyond normal self-heating of the bolometer and to observe a temperature decay. The TTC can be determined from the temperature decay. The reference detectors are not utilized to detect scene information and can be used as detectors that are in the same vacuum as the active detectors and can be used to measure TTC. A bias applied to the reference detectors of the imaging device can be changed during operation of the imaging device for the imaging device to measure the TTC in real time on each frame and using the TTC to determine if the vacuum of the imaging device has degraded or is lost. In an aspect, a change in vacuum pressure is associated with a proportional change to the TTC. Example techniques for pulse-biasing detectors may be found in U.S. Pat. No. 8,471,206, which is incorporated herein by reference in its entirety.

In an embodiment, to measure the health of the imaging device, the TTC and/or vacuum integrity of the reference detectors can be evaluated at frame rate by reading the reference detectors concurrently with the active detectors at the frame rate. In another embodiment, the TTC and/or vacuum integrity can be evaluated at faster than the frame rate. In some aspects, positioning of reference unit cells in relation to active unit cells may affect a rate at which the TTC and/or vacuum integrity can be evaluated. In a case of a row-based readout architecture, a pulse-biasing technique may be applied to the blind detectors each row at a time. A host (e.g., the ADAS or a user thereof) may monitor an output of the reference detectors and determine whether the temperature decay is within nominal operational ranges to determine whether a rest of the frame data has been captured in a valid state. Frame data may be referred to as being captured in a valid state when the imaging device is determined to be healthy. For an imaging device that is not healthy, frame data from the imaging device may be an inaccurate representation of the scene.

Figure 6:
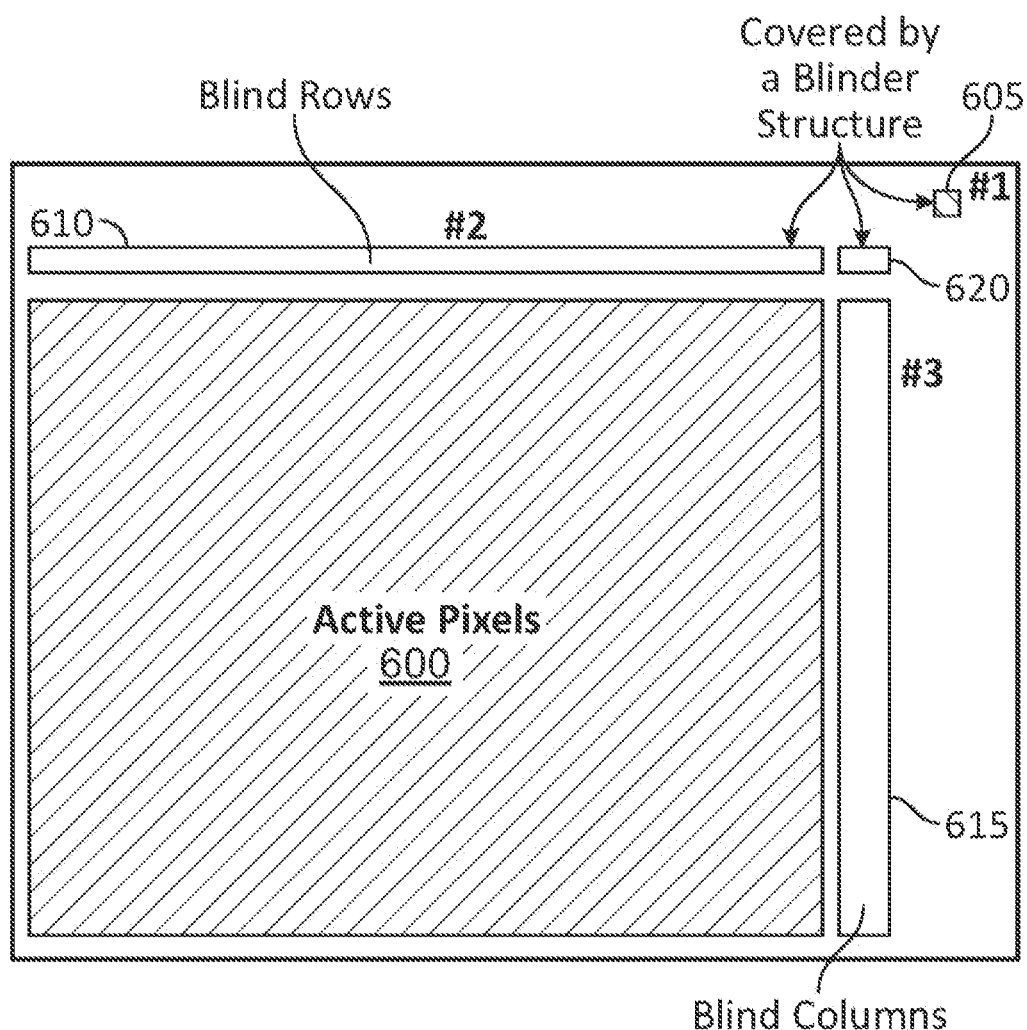
FIG. 6 illustrates an example array of active unit cells and potential locations for one or more reference unit cells in accordance with one or more embodiments of the present disclosure.

Reference unit cells can be provided in one or more locations of the imaging device. As an example, FIG. 6 illustrates an example array 600 (e.g., also referred to as an active array) of active unit cells and potential locations 605, 610, 615, and 620 for one or more reference unit cells in accordance with one or more embodiments of the present disclosure. The active unit cells of the array 600 are generally sensitive to changes (e.g., minute changes) in scene temperature. To facilitate such sensitivity, the array 600 may be thermally isolated, for example, from an ROIC coupled to the array 600 and/or convection within a sensor cavity. In some embodiments, thermal isolation may be achieved through a detector being mechanically raised on a table-like structure (e.g., mesa-like structure) by thin legs over the ROIC and being packaged in a vacuum to prevent thermal convection through gaseous particles transferring heat. In an embodiment, the array 600 and potential locations 605, 610, 615, and 620 may collectively provide, include, be a part of, the unit cell array 205 of FIG. 2. It is noted that the potential locations 605, 610, 615, and/or 620, or none of the potential locations 605, 610, 615, and 620 include one or more reference unit cells. It is further noted that the potential locations 605, 610, 615, and 620 are provided by way of non-limiting examples. Alternatively or in addition, one or more reference unit cells may be provided in another location.

The potential location 605 is independent and away from the array 600. In this case, the pulse bias method may be utilized with the array 600 and a reference unit cell(s) at the potential location 605 to determine vacuum health at the frame rate. The potential location 610 represents one or more rows of reference unit cells above and/or below the array 600. The row(s) of reference unit cells share a row-based readout architecture with the array 600 (e.g., the active unit cells of the array 600). Similar to providing a reference unit cell(s) at the potential location 605, the row(s) of reference unit cell would also be limited to being read out at frame rate. In one case, a potential location 620 may include a reference unit cell(s) read out together with reference unit cells at the potential location 610.

The potential location 615 represents one or more columns of reference unit cells to the left and/or right of the array 600. The column(s) of reference unit cells share a row-based readout architecture and can be read out at the end of each row. In one case, the potential location 620 may include a reference unit cell(s) read out together with reference unit cells at the potential location 615. By using such reference columns and measuring a health of the imaging device (e.g., vacuum integrity of the imaging device) at a row rate (e.g., frame rate divided by number of rows of the array 600) for the pulse bias method, an amount of time to detect faults (e.g., FTDI in ADAS applications) may occur faster relative to a case in which the reference unit cells are read at the frame rate.

Note that the foregoing is in relation to a row-based readout architecture. In a column-based readout architecture, the potential location 610 may include one or more columns of reference unit cells to the left and/or right of the array 600, with the column-based readout architecture shared by the array 600 and the reference unit cells. Detection of faults may occur at the frame rate when reference unit cells at the potential location 610 are utilized. The potential location 615 may include one or more rows of reference unit cells above and/or below the array 600. In this case, the health of the imaging device can be determined at a column rate (e.g., frame rate divided by number of column of the array 600) based on reading out the blind row(s).

In some aspects, a host (e.g., the ADAS or a user thereof) evaluates the various active and/or reference unit cells. In some aspects, evaluation of the reference detectors may be performed by the ROIC to comparing a decay rate of the reference detectors to circuitry with a known decay rate. In some cases, such evaluations may be provided as a live test mode and/or by the ROIC. The reference detectors can be pulse-biased and an output of the reference detectors may go through a comparator.

As an example, the reference detectors can be pulse-biased and compared against a first threshold decay rate, such as 6 ms. In this example, if the TTC is above the first threshold decay rate, an error bit (e.g., error flag) can be set in an output data stream. Alternatively or in addition, the reference detectors can be compared against a second threshold decay rate, such as 10 ms. If the TTC is below the second threshold decay rate, a separate error bit can be set in the output data structure. The blind detector's decay can be compared to a 6 ms and 10 ms reference decay. If the decay is outside the reference decays, then an error bit can be set in the sensor's output data. In performing such evaluations at the ROIC (or other component of the imaging device), the host may be alleviated from having to compare live data from the reference detectors and instead look for a status bit(s) (e.g., a state of the error bit(s)) from the ROIC (or other component of the imaging device), which may reduce fault detection time (e.g., FTDI) by reducing processing time at the host (e.g., host ADAS system).

In general, knowing a validity of data (e.g., of the imaging device) for each data transmission is important. In various embodiments, techniques are provided to facilitate validity of such data. In an example automotive application, data transmission may be from detectors (e.g., bolometers) to image processing electronics, an electronic control unit(s) (ECU(s)), a final ADAS decision maker (e.g., for controlling navigation of an automobile), and/or any intermediate data handoff. Table 1 provides an example image frame format for facilitating verification of data between the imaging device and an ECU.

TABLE 1

Image Frame Format

| Line | CONTROL | | | VIDEO or TELE | PAD | CRC |
|---|---|---|---|---|---|---|
| | 16 bits | 16 bits | 2 × 16 bits | 640 × 16 bits | 2 × 16 bits | 2 × 16 bits |
| 0 | FC | LC (0) | STAT | TELE00 | PAD | CRC |
| 1 | FC | LC (1) | STAT | TELE01 | PAD | CRC |
| 2 | FC | LC (2) | STAT | VIDEO0 | PAD | CRC |
| 3 | FC | LC (3) | STAT | VIDEO1 | PAD | CRC |
| ... | FC | LC (x) | STAT | VIDEOx | PAD | CRC |
| 513 | FC | LC (513) | STAT | VIDEO511 | PAD | CRC | where FC denotes a frame counter, LC denotes a line counter, STAT denotes status data, TELE denotes telemetry line, VIDEOx denotes a row of image/video data from the imaging device where x=0, 1, . . . , 511, CRC denotes a checksum (e.g., 32 bit checksum), and PAD denotes padding bits (e.g., 32 bits of zeros to retain 8-byte boundary scheme). As shown in Table 1, lines 0 and 1 of an image frame includes telemetry data and lines 2 through 513 includes image/video data. For example, line 2 of the image frame includes image/video data from detectors in row 0 of a detector array and line 513 of the image frame includes image/video data from detectors in row 511 of the detector array.

In some embodiments, test and meta data from detectors can be provided (e.g., injected) in image frames to facilitate monitoring of health of the imaging device. Such data and verification thereof may be utilized to determine existence of missed frames, delay, latency, and/or varying frame rate. The data and verification thereof may be utilized to ensure that the imaging device and components downstream of the imaging device (e.g., other components of the ADAS system) are processing correct data for a given time (e.g., rather than outdated data or otherwise desynchronized data). The imaging device may count each detector within a row while being readout by the ROIC. Such a counter value may be referred to as a detector counter/number or pixel counter/number. Such a counter value can be appended to the row (e.g., data of the image frame associated with the row) as well as a current frame counter/number, a current line counter/number (e.g., indicative of a current row counter/number), and meta data. When a line of the image frame (e.g., associated with a row) is complete, a hash value may be computed for the line and appended to the line. In an aspect, the hash may be a cyclic redundancy check (CRC). The hash value can be computed for each row of the imaging device's detector array and embedded in the data output (e.g., the image frame).

As an example, FIG. 7 illustrates an example image frame format 700 in accordance with one or more embodiments of the present disclosure. The image frame format may be utilized in automotive applications. An image frame having the image frame format 700 includes lines (e.g., ECU telemetry lines or camera lines), with each line including frame counters (FC), line counters (LC), pixel counters (PC), meta data (Meta), and hash data (HASH). The image frame format 700 includes data indicative of FCs, LCs, PCs, Meta, and HASH for an ECU, an imaging device (denoted as camera in FIG. 7), and detectors of the imaging device (denoted as sensor in FIG. 7). Meta data may include, for example, input counter and/or timestamp from further upstream of data path. Hash values (e.g., CRC values) are determined for each line, denoted as ECU line HASH and camera line HASH. It is noted that FIG. 7 provides one example image frame format. Various fields of the image frame format 700 can be reordered from that shown in FIG. 7. Other image frame formats may include additional, fewer, and/or different fields.

By including a respective hash value (e.g., the CRC) for each line of the image frame, the imaging device may compute an expected hash value for each line (e.g., associated with a row) of the image frame (based on the data for each row excluding the hash value itself that is embedded in the image frame), and compare the expected hash value to the embedded hash value to determine a validity of the data transmission from the imaging device. The hash value may be utilized to verify a quality of the various counters/numbers that are embedded in the image frames. The frame counter provided in each line of the image frame may be utilized to verify that the data stream is continuous, the frames are received in the correct order, and no data was lost or created. Verifications may also be performed to determine that there are a correct number of rows, the rows are in the correct order, and there are a correct number of detectors in each row.

In some aspects, the meta data embedded in the image frame includes a timestamp. The timestamp provides a relative system clock that can be utilized by the imaging device running from an external system clock to allow verification of latency and delay between frames from the imaging device. Such verification can allow accurate synchronization of the imaging device with other devices (e.g., sensors) of a larger system (e.g., car system) and can allow precisely determining when data from the imaging device was taken, delay, and/or latency from the imaging device. Such verification is in contrast to conventional approaches. In convention approaches, a sync pulse is received by the imaging device and a frame generated in response to the received sync pulse, but the imaging device is unable to determine which pulse corresponds to which image frame in time.

In an aspect, a timestamp and/or counter(s) may be provided to the ROIC (and/or other camera electronics) for the ROIC (and/or other ROIC electronics) to encode in a sensor output. The counter may be utilized to facilitate monitoring of timing of the frames, and the hash value may be utilized to verify the counter. In some cases, the time stamp marker or frame counter may be provided to the ROIC or other camera electronics to help ensure that there are no dropped frames from the data provided to a host. In some cases, the time stamp marker/counter and a CRC can be provided to the host as meta data, such as telemetry data, to help ensure/verify system health. In some cases, sensor level time stamp (e.g., per line or per frame) can be utilized to synchronize with other sensors. Detection of missed frames, latency, change in frame rate, and unexpected delays may be facilitated. The system may determine that it is operating on the correct data at the correct time, which facilitates safety enhancement. In an aspect, a host or central processor of a car can provide a counter or a timestamp to the imaging device. The imaging device can perform CRC on the input or otherwise mark the input and embed the CRC or other mark in data output by the imaging device. Such a host-provided input can be the same counter provided to one or more other sensors, which then allows the host or car to determine delay and latency through the entire system by utilizing the sensor(s) and imaging device.

In some embodiments, a known digital pattern may be provided in (e.g., injected into) image frames to facilitate verification of health of the imaging device. The digital pattern may be embedded into the pixel data. The pattern may be embedded in the data from the active pixels and/or the reference pixels. Such a pattern may be analyzed and subsequently removed by camera electronics. In an aspect, the pattern may be utilized to verify health of the imaging device and alert the host if data is being corrupted. In this regard, the imaging device has knowledge of the pattern superimposed on the pixel data and is expected to be able to remove the pattern from the data before the pattern is used (e.g., provided for processing, storage, and/or display). For example, the camera electronics can monitor the pattern and alert the host if the pattern is altered. In this example, a problem with the sensor may be determined to exist if, after extraction, a portion of the pattern remains in the image. In an aspect, such a digital pattern may be referred to as a digital watermark.

In an aspect, such a digital pattern may be provided after an ADC. After the ADC, the sensor can superimpose a pattern onto image data. The pattern may be static or varying pattern. As one example, the pattern can be in a fixed location but varying in time (e.g., like a timestamp). As another example, the pattern can be a fixed pattern that varies its location with each frame. For instance, the pattern may slide along each frame, such that for each frame the pattern shifts by one pixel relative to a previous frame.

Figure 8:
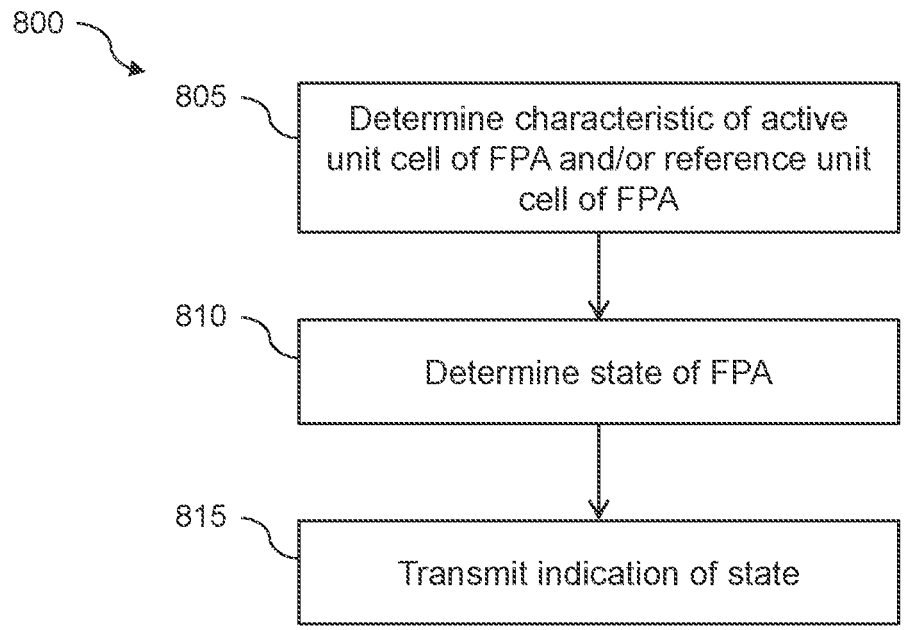
FIG. 8 illustrates a flow diagram of an example of a process for facilitating monitoring health of an imaging device in accordance with one or more embodiments of the present disclosure.

FIG. 8 illustrates a flow diagram of an example of a process 800 for facilitating monitoring health of an imaging device in accordance with one or more embodiments of the present disclosure. For explanatory purposes, the process 800 is described herein with reference to the imaging system 100 of FIG. 1; however, the process 800 is not limited to various components of the imaging system 100 of FIG. 1. Note that one or more operations may be combined, omitted, and/or performed in a different order as desired.

At block 805, a characteristic of at least one active unit cell of an FPA (e.g., of the imaging system 100) and/or a characteristic of at least one reference unit cell of the FPA is determined (e.g., by the imaging system 100). In some cases, the characteristic may be associated with a vacuum integrity of the FPA. By way of non-limiting examples, the characteristic may be a PSD (e.g., FPN and/or RND components), thermal time constant, and temperature decay rate.

At block 810, a state of the FPA is determined (e.g., by the imaging system 100) based at least in part on the characteristic. As one example, the state of the FPA may be determined based on a comparison of a characteristic (e.g., PSD and/or vacuum integrity) of the active unit cells with a corresponding characteristic of the reference unit cells. As another example, the state of the FPA may be determined based on a comparison of a characteristic (e.g., PSD) of the active unit cells with a corresponding characteristic previously determined and stored (e.g., PSD determined during a previous calibration event and stored for future use). In an aspect, the state of the FPA may be a healthy state or an unhealthy state.

At block 815, an indication of the state of the FPA is transmitted. As an example, the indication may be transmitted to another part of the imaging system 100 that includes the FPA and/or a larger system that includes the imaging system 100, such as an ADAS. In some cases, the indication of a healthy state can be transmitted to verify that the FPA is determined to be operating correctly. In some cases, the indication of an unhealthy may indicate that mitigation actions may need to be performed on the FPA. When a potential problem of the FPA is identified and flagged via the indication, mitigation actions may be performed. By way of non-limiting examples, mitigation actions may include utilizing a different imaging device for imaging a scene, powering down the imaging device until the imaging device can be fixed, ignoring images of the scene being provided by the imaging device (e.g., since the images may be an inaccurate representation of the scene), and/or other actions.

Figure 9:
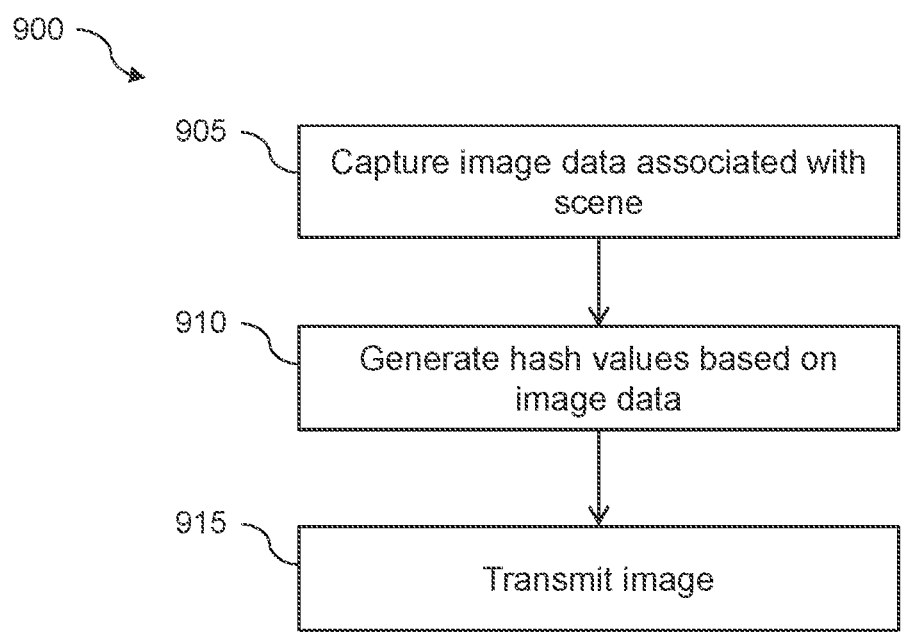
FIG. 9 illustrates a flow diagram of an example of a process for generating an image in accordance with one or more embodiments of the present disclosure.

FIG. 9 illustrates a flow diagram of an example of a process 900 for generating an image in accordance with one or more embodiments of the present disclosure. For explanatory purposes, the process 900 is described herein with reference to the imaging system 100 of FIG. 1; however, the process 900 is not limited to various components of the imaging system 100 of FIG. 1. Note that one or more operations may be combined, omitted, and/or performed in a different order as desired.

At block 905, image data associated with the scene 160 is captured (e.g., by the image detector circuit 165). At block 910, hash values are generated (e.g., by the readout circuit 170 or other component) based at least on the image data. In some cases, at least a subset of the hash values is generated further based on a respective detector identifier associated with a detector of the image detector circuit 165 that generated a respective portion of the image data, a current frame number, a current line number, a timestamp associated with a time of capture of the image data, and/or a data pattern (e.g., watermark). In a case that the image detector circuit 165 includes an array of detectors, a row of the array may be associated with one line of an image. At block 915, an image is transmitted. The image includes the image data, the hash values, and other data (e.g., current frame number, current line number) utilized to generate the hash values.

Figure 10:
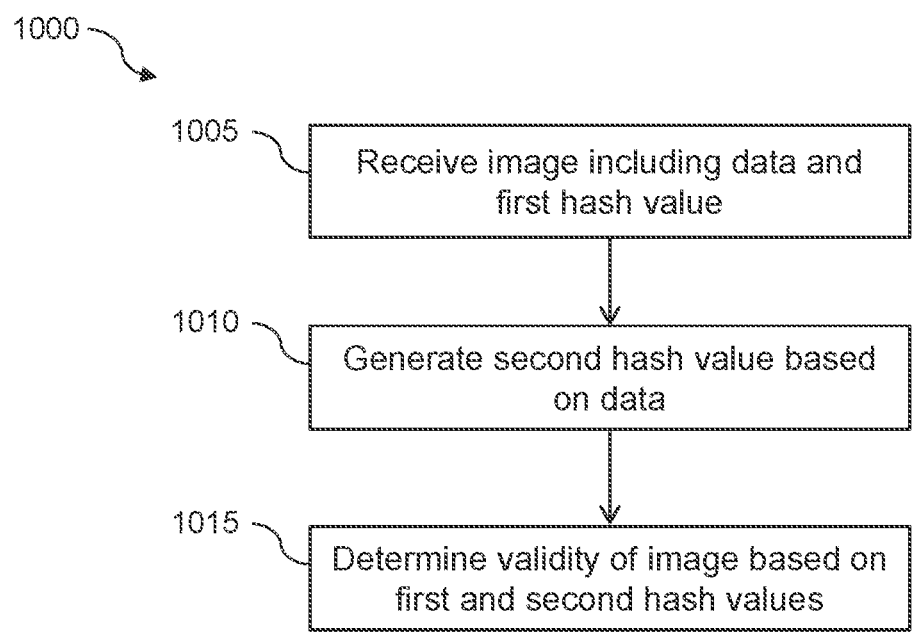
FIG. 10 illustrates a flow diagram of an example of a process for determining validity of a received image in accordance with one or more embodiments of the present disclosure.

FIG. 10 illustrates a flow diagram of an example of a process 1000 for determining validity of a received image in accordance with one or more embodiments of the present disclosure. Note that one or more operations may be combined, omitted, and/or performed in a different order as desired. In an embodiment, the process 1000 may be performed by an ADAS system that includes or is otherwise coupled to the imaging system 100. At block 1005, an image that includes data and a first hash value is received (e.g., by an ADAS system). The data may include image data and other data, such as a detector identifier, a current frame number, a current line number, a timestamp associated with a time of capture of the image data, and/or a data pattern (e.g., watermark). At block 1010, a second hash value is generated based on the data. At block 1015, a validity of the image is determined based on the first hash value and the second hash value. If the first hash value matches the second hash value, the image can be determined to be valid and the image data and/or other data contained therein can be utilized (e.g., by the ADAS system). If the first hash value does not match the second hash value, the image can be determined to not be valid. When the image is determined not to be valid, subsequent processing may be performed to determine whether the data contained in the image may be usable. Alternatively or in addition, troubleshooting and/or mitigating actions (e.g., fixes) can be performed on the imaging system 100 that generated the image.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
applying a pulse bias signal to at least one reference unit cell of a focal plane array (FPA);
determining, by a readout circuit of the FPA, a temperature decay rate associated with the at least one reference unit cell after the applying;
determining at least one characteristic of at least one active unit cell of the FPA and/or the at least one reference unit cell of the FPA, wherein the at least one active unit cell comprises a detector selectively shielded from an incident scene, wherein the at least one reference unit cell comprises a reference detector shielded from the incident scene, wherein the at least one characteristic is based at least in part on the temperature decay rate, and wherein the at least one characteristic comprises a thermal time constant associated with the at least one reference unit cell;
determining a state of the FPA based at least in part on the at least one characteristic, wherein the state of the FPA is based on whether the temperature decay rate is below a first threshold, above a second threshold, and/or between the first threshold and the second threshold; and
transmitting an indication of the state of the FPA to selectively cause adjustment of the FPA.

2. The method of claim 1, wherein the indication is transmitted as part of an image that comprises image data indicative of the incident scene; and wherein the indication is transmitted to an advanced driver assistance system to facilitate operation of a vehicle that comprises the FPA.

3. The method of claim 1, further comprising:
generating a hash value based on data associated at least in part with the incident scene;
generating an image comprising the data and the hash value; and
transmitting the image, and wherein the data comprises a detector identifier associated with the at least one active unit cell, a frame number, a line number associated with the at least one active unit cell, a timestamp, and/or a watermark.

4. The method of claim 1, wherein the at least one characteristic is indicative of a vacuum integrity associated with the at least one active unit cell and/or a vacuum integrity associated with the at least one reference unit cell.

5. The method of claim 1, wherein the at least one characteristic further comprises a difference between a power spectral density associated with the at least one active unit cell when the detector of the at least one active unit cell is shielded from the incident scene and a power spectral density associated with the at least one reference unit cell.

6. The method of claim 1, wherein the at least one characteristic further comprises a difference between a power spectral density associated with the at least one active unit cell when the detector of the at least one active unit cell is not shielded from the incident scene and a power spectral density associated with the at least one reference unit cell.

7. The method of claim 1, further comprising determining a power spectral density associated with the at least one active unit cell when the detector of the at least one active unit cell is not shielded from the incident scene, and wherein the at least one characteristic further comprises a difference between the power spectral density and a stored power spectral density determined during a calibration of the FPA.

8. The method of claim 1, wherein the at least one characteristic is determined by the readout circuit, and wherein:
each active unit cell comprises a detector that selectively captures the incident scene; and
each reference unit cell comprises a detector and a structure that blocks the incident scene from the detector of the reference unit cell.

9. The method of claim 1, wherein the at least one characteristic further comprises a power spectral density associated with the at least one active unit cell and/or a power spectral density associated with the at least one reference unit cell.

10. The method of claim 1, further comprising:
generating a plurality of hash values based on data associated with the incident scene, wherein each of the plurality of hash values is based on a portion of the data from a corresponding line of active unit cells of the FPA;
generating an image comprising the data from the active unit cells of the FPA and the plurality of hash values; and
transmitting the image.

11. A method comprising:
receiving an image comprising data and a first hash value;
generating a second hash value based on the data;
determining existence of missed frames, delay, latency, and/or non-constant frame rate based at least on the first hash value and the second hash value; and
determining a validity of the image based at least on the existence of missed frames, delay, latency, and/or non-constant frame rate.

12. The method of claim 11, wherein the data comprises a detector identifier associated with an active unit cell, a frame number, a line number associated with the active unit cell, a timestamp, and/or a watermark.

13. The method of claim 11, wherein:
the received image comprises the data and a first plurality of hash values, wherein the first plurality of hash values comprises the first hash value;
each of the first plurality of hash values is associated with a corresponding line of the image;
the generating comprises generating a second plurality of hash values based on the data, wherein the second plurality of hash values comprises the second hash value;
each of the second plurality of hash values is generated based on a portion of the data associated with a corresponding line of the image; and
the validity is based on a comparison of each of the first plurality of hash values with the hash value of the second plurality of hash values corresponding to the same line of the image.

14. An imaging system comprising:
a focal plane array (FPA) comprising:
a plurality of active unit cells, wherein each active unit cell comprises a detector configured to selectively generate an output in response to an incident scene;
a plurality of reference unit cells, wherein each reference unit cell comprises a detector and a structure configured to block the incident scene from the detector of the reference unit cell; and
a readout circuit comprising a processing circuit, wherein the processing circuit is configured to:
determine a first characteristic of at least one active unit cell of the plurality of active unit cells and/or at least one reference unit cell of the plurality of reference unit cells, wherein the first characteristic comprises a difference between a power spectral density associated with the at least one active unit cell and a power spectral density associated with the at least one reference unit cell;
determine a state of the FPA based at least in part on the first characteristic; and
transmit an indication of the state of the FPA to selectively cause adjustment of the FPA.

15. The imaging system of claim 14, wherein the plurality of active unit cells is arranged in columns and rows of an array, and wherein the readout circuit is configured to read each row of the array concurrently with a respective one or more of the plurality of reference unit cells; and wherein the indication is transmitted to an advanced driver assistance system to facilitate operation of a vehicle that comprises the imaging system.

16. The imaging system of claim 14, wherein the processing circuit is further configured to:
generate a hash value based on data associated at least in part with the incident scene;
generate an image comprising the data and the hash value; and
transmit the image, and wherein the data comprises a detector identifier associated with the at least one active unit cell, a frame number, a line number associated with the at least one active unit cell, a timestamp, and/or a watermark.

17. The imaging system of claim 14, wherein the first characteristic is indicative of a vacuum integrity associated with the at least one active unit cell and/or a vacuum integrity associated with the at least one reference unit cell.

18. The imaging system of claim 14, wherein the processing circuit is further configured to;
    determine a temperature decay rate associated with the at least one reference unit cell in response to a pulse bias signal applied to the at least one reference unit cell; and
    determine a second characteristic based at least in part on the temperature decay rate, wherein the state of the FPA is further based on the second characteristic.

19. The imaging system of claim 14, wherein the processing circuit is further configured to:
    determine the power spectral density associated with the at least one active unit cell when the detector of the at least one active unit cell is not shielded from the incident scene; and
    determine a second characteristic comprising a difference between the power spectral density associated with the at least one active unit cell when the detector of the at least one active unit cell is not shielded from the incident scene and a stored power spectral density determined during a calibration of the FPA.

20. The imaging system of claim 14, wherein the processing circuit is further configured to determine the power spectral density associated with the at least one active unit cell when the detector of the at least one active unit cell is shielded from the incident scene.

\* \* \* \* \*

UNITED STATES PATENT AND TRADEMARK OFFICE
CERTIFICATE OF CORRECTION

Page 1 of 1

PATENT NO. : 12,101,459 B2
APPLICATION NO. : 17/611859
DATED : September 24, 2024
INVENTOR(S) : Dylan M. Rodriguez et al.

It is certified that error appears in the above-identified patent and that said Letters Patent is hereby corrected as shown below:

In the Specification

In the DETAILED DESCRIPTION:
Column 6, Lines 24-25, change "mid-wave IR (MMIR) radiation" to --mid-wave IR (MWIR) radiation--.

Signed and Sealed this
Thirty-first Day of December, 2024

Derrick Brent
*Acting Director of the United States Patent and Trademark Office*